United States Patent [19]

Cohn et al.

[11] Patent Number: 5,379,398
[45] Date of Patent: Jan. 3, 1995

[54] METHOD AND SYSTEM FOR CONCURRENT ACCESS DURING BACKUP COPYING OF DATA

[75] Inventors: Oded Cohn, Haifa, Israel; Michael H. Hartung, Tucson, Ariz.; John N. McCauley, Jr., Tucson, Ariz.; William F. Micka, Tucson, Ariz.; Claus W. Mikkelsen, Morgan Hill, Calif.; Kenneth M. Nagin, Tucson, Ariz.; Yoram Novick; Alexander Winokur, both of Haifa, Israel

[73] Assignee: International Business Machines Corporation, Armonk, N.Y.

[21] Appl. No.: 871,247

[22] Filed: Apr. 20, 1992

[51] Int. Cl.⁶ .................... G06F 12/02; G06F 12/16
[52] U.S. Cl. ................ 395/425; 395/575; 364/DIG. 1; 364/268; 364/256.5
[58] Field of Search .................... 395/425, 575, 600

[56] References Cited

U.S. PATENT DOCUMENTS

| | | | |
|---|---|---|---|
| 3,400,371 | 9/1968 | Amdahl et al. | 395/375 |
| 4,207,609 | 1/1980 | Luiz et al. | 395/325 |
| 4,507,751 | 3/1985 | Gawlick et al. | 395/575 |
| 4,633,387 | 12/1986 | Hartung et al. | 395/650 |
| 4,755,928 | 7/1988 | Johnson et al. | 395/575 |
| 4,855,907 | 8/1989 | Ferro, Jr. et al. | 395/425 |
| 5,175,849 | 12/1992 | Schneider | 395/575 |
| 5,239,659 | 8/1993 | Rudeseal et al. | 395/800 |
| 5,241,668 | 8/1993 | Eastridge et al. | 395/575 |
| 5,241,669 | 8/1993 | Cohn et al. | 395/575 |
| 5,241,670 | 8/1993 | Eastridge et al. | 395/575 |

Primary Examiner—Joseph L. Dixon
Assistant Examiner—Reginald Bragdon
Attorney, Agent, or Firm—Flesman, Bradley, Gunter & Dillion, LLP; H. St. Julian; Andrew J. Dillon

[57] ABSTRACT

A method and system are disclosed for permitting high concurrency of access during backup copying of designated data stored within a storage subsystem which includes multiple storage devices coupled to the data processing system via a storage subsystem control unit having subsystem memory therein. Data within each storage device is accessed utilizing a Unique Control Block (UCB), which identifies a selected storage device, and an associated data retrieval command sequence which identifies the data to be accessed. Portions of the data copied to subsystem memory within the subsystem storage control unit as sidefiles from a first storage device may be accessed utilizing a Unique Control Block (UCB) associated with an alternate storage device by associating a selected data retrieval command sequence therewith which identifies the data as stored within the subsystem memory. In this manner, data from a first storage device may be accessed utilizing an alternate Unique Control Block (UCB), permitting concurrent access of data utilizing the Unique Control Block (UCB) associated with the first storage device.

11 Claims, 4 Drawing Sheets

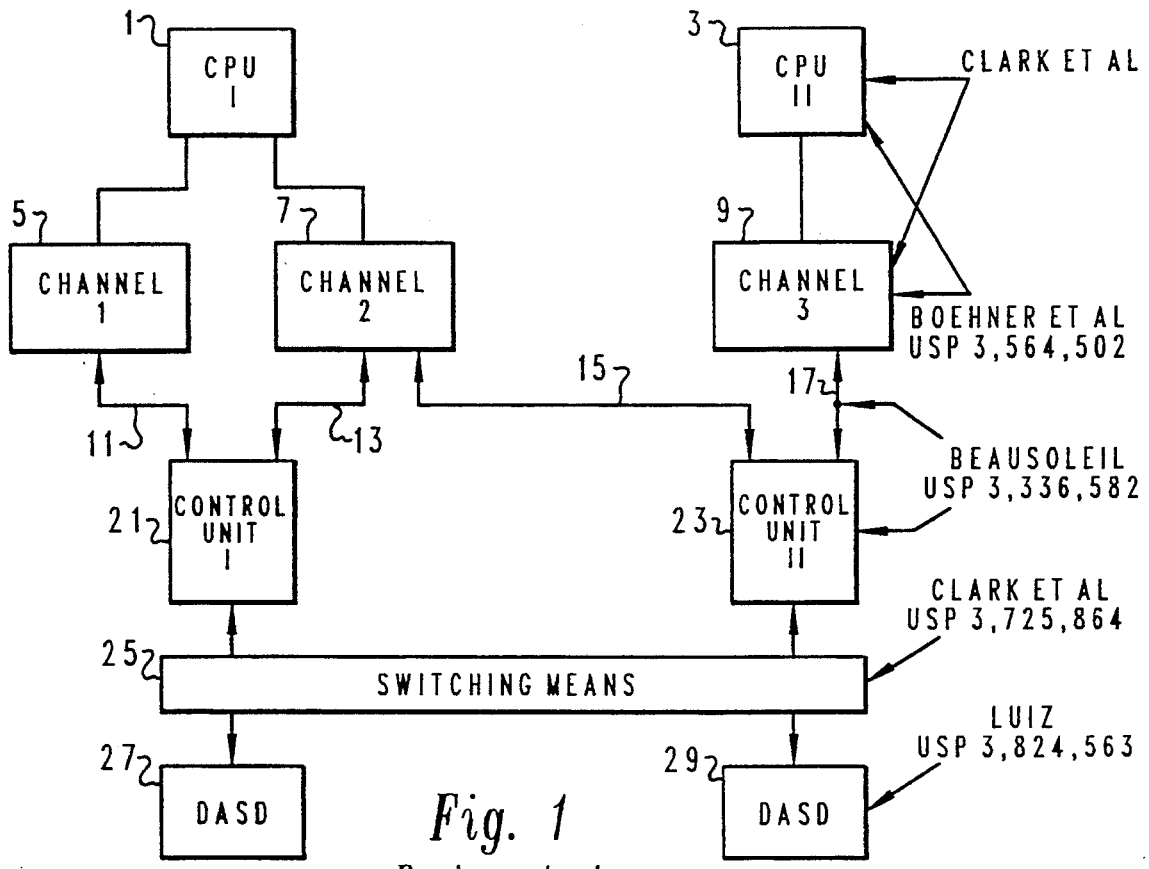
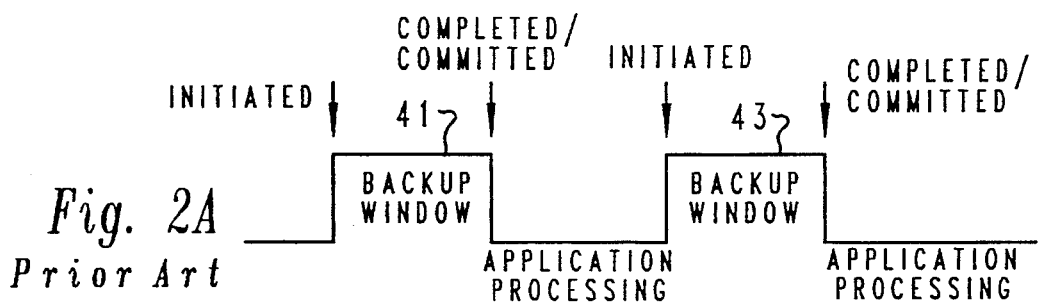
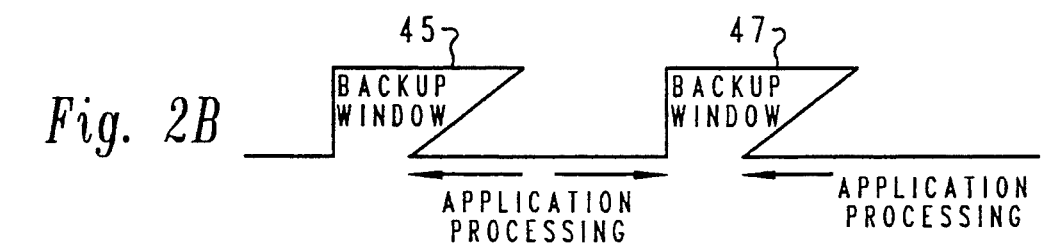

METHOD AND SYSTEM FOR CONCURRENT ACCESS DURING BACKUP COPYING OF DATA

CROSS-REFERENCE TO RELATED APPLICATION

The present application is related to U.S. patent application Ser. No. 07/781,044, now abandoned entitled *Method and Means for Time Zero Backup Copying of Data*, filed Oct. 18, 1991, and assigned to the assignee herein named. The contents of the cross-reference U.S. patent application are hereby incorporated herein by reference thereto. The present application is also related to U.S. Pat. Nos. 5,241,670; 5,241,669; and 5,241,668 which are also assigned to the assignee herein named.

BACKGROUND OF THE INVENTION

1. Technical Field

This invention relates in general to methods and systems for permitting concurrent access to datasets in external storage associated with accessing data processing systems, and in particular the present invention relates to concurrent access to data during backup copying of datasets in external storage. Still more particularly, the present invention relates to a method and system for concurrent access to datasets in a data processing system during a time zero backup copying operation.

2. Description of the Related Art

A modern data processing system must be prepared to recover, not only from corruptions of stored data which occur as a result of noise bursts, software bugs, media defects, and write path errors, but also from global events, such as data processing system power failure. The most common technique of ensuring the continued availability of data within a data processing system is to create one or more copies of selected datasets within a data processing system and store those copies in a nonvolatile environment. This so-called "backup" process occurs within state-of-the-art external storage systems in modern data processing systems.

Backup policies are implemented as a matter of scheduling. Backup policies have a space and time dimension which is exemplified by a range of datasets and by the frequency of backup occurrence. A FULL backup requires the backup of an entire range of a dataset, whether individual portions of that dataset have been updated or not. An INCREMENTAL backup copies only that portion of the dataset which has been updated since a previous backup, either full or incremental. The backup copy thus created represents a consistent view of the data within the dataset as of the time the copy was created.

Of course, those skilled in the art will appreciate that as a result of the process described above, tile higher the backup frequency, the more accurately the backup copy will mirror the current state of data within a dataset. In view of the large volumes of data maintained within a typical state-of-the-art data processing system backing up that data is not a trivial operation. Thus, the opportunity cost of backing up data within a dataset may be quite high on a large multiprocessing, multiprogramming facility, relative to other types of processing.

Applications executed within a data processing system are typically executed in either a batch (streamed) or interactive (transactional) mode. In a batch mode, usually one application at a time executes without interruption. Interactive mode is characterized by interrupt driven multiplicity of applications or transactions.

When a data processing system is in the process of backing up data in either a streamed or batch mode system, each process, task or application within the data processing system is affected. That is, the processes supporting streamed or batch mode operations are suspended for the duration of the copying. Those skilled in the art will recognize that this event is typically referred to as a "backup window." In contrast to batch mode operations, log based or transaction management applications are processed in the interactive mode. Such transaction management applications eliminate the "backup window" by concurrently updating an on-line dataset and logging the change. However, this type of backup copying results in a consistency described as "fuzzy." That is, the backup copy is not a precise "snapshot" of the state of a dataset/data base at a single point in time. Rather, a log comprises an event file requiring further processing against the database.

A co-pending U.S. patent application Ser. No. 07/385,647, filed Jul. 25, 1989, entitled *A Computer Based Method For Dataset Copying Using an Incremental Backup Policy*, illustrates backup in a batch mode system utilizing a modified incremental policy. A modified incremental policy copies only new data or data updates since the last backup. It should be noted that execution of applications within the data processing system are suspended during copying in this system.

As described above, to establish a prior point of consistency in a log based system, it is necessary to "repeat history" by replaying the log from the last check point over the datasets or database of interest. The distinction between batch mode and log based backup is that the backup copy is consistent and speaks as of the time of its last recordation, whereas the log and database mode require further processing in the event of a fault, in order to exhibit a point in time consistency.

U.S. Pat. No. 4,507,751, Gawlick et al., entitled *Method and Apparatus for Logging Journal Data Using a Write Ahead Dataset*, issued Mar. 25, 1985, exemplifies a transaction management system wherein all transactions are recorded on a log on a write-ahead dataset basis. As described within this patent, a unit of work is first recorded on the backup medium (log) and then written to its external storage address.

Co-pending U.S. patent application Ser. No. 07/524,206, filed May 16, 1990, entitled *Method and Apparatus for Executing Critical Disk Access Commands*, teaches the performance of media maintenance on selected portions of a tracked cyclic operable magnetic media concurrent with active access to other portions of the storage media. The method described therein requires the phased movement of customer data between a target track to an alternate track, diversion of all concurrent access requests to the alternate track or tracks and the completion of maintenance and copy back from the alternate to the target track.

Requests and interrupts which occur prior to executing track-to-track customer data movement result in the restarting of the process. Otherwise, requests and interrupts occurring during execution of the data movement view a DEVICE BUSY state. This typically causes a requeueing of the request.

In view of the complex time consuming nature of backup copying of data, it should be appreciated that a need exists for a method and system which permits concurrent access to data within external storage during backup copying wherein delays occasioned by awaiting access to a selected storage device may be minimized despite system constraints which limit access to a single storage device.

SUMMARY OF THE INVENTION

It is therefore one object of the present invention to provide an improved method and system for permitting concurrent access to datasets in external storage associated with accessing data processing systems.

It is another object of the present invention to provide an improved method and system for providing concurrent access to data during backup copying of records in external storage.

It is yet another object of the present invention to provide an improved method and system for concurrent access to records in a data processing system during a time zero backup copying operation.

The foregoing objects are achieved as is now described. A method and system are disclosed for permitting high concurrency of access during backup copying of designated data stored within a storage subsystem which includes multiple storage devices coupled to the data processing system via a storage subsystem control unit having subsystem memory therein. Data within each storage device is accessed utilizing a Unique Control Block (UCB), which identifies a selected storage device, and an associated data retrieval command sequence which identifies the data to be accessed. Portions of the data copied to subsystem memory within the subsystem storage control unit as sidefiles from a first storage device may be accessed utilizing a Unique Control Block (UCB) associated with an alternate storage device by associating a selected data retrieval command sequence therewith which identifies the data as stored within the subsystem memory. In this manner, data from a first storage device may be accessed utilizing an alternate Unique Control Block (UCB), permitting concurrent access of data utilizing the Unique Control Block (UCB) associated with the first storage device.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a typical multiprocessing, multiprogramming environment according to the prior art where executing processors and applications randomly or sequentially access data from external storage;

FIGS. 2A-2B depict time line illustrations of the backup window in a batch or streaming process in the prior art and in a time zero backup system;

DETAILED DESCRIPTION OF PREFERRED EMBODIMENT

Figure 3:
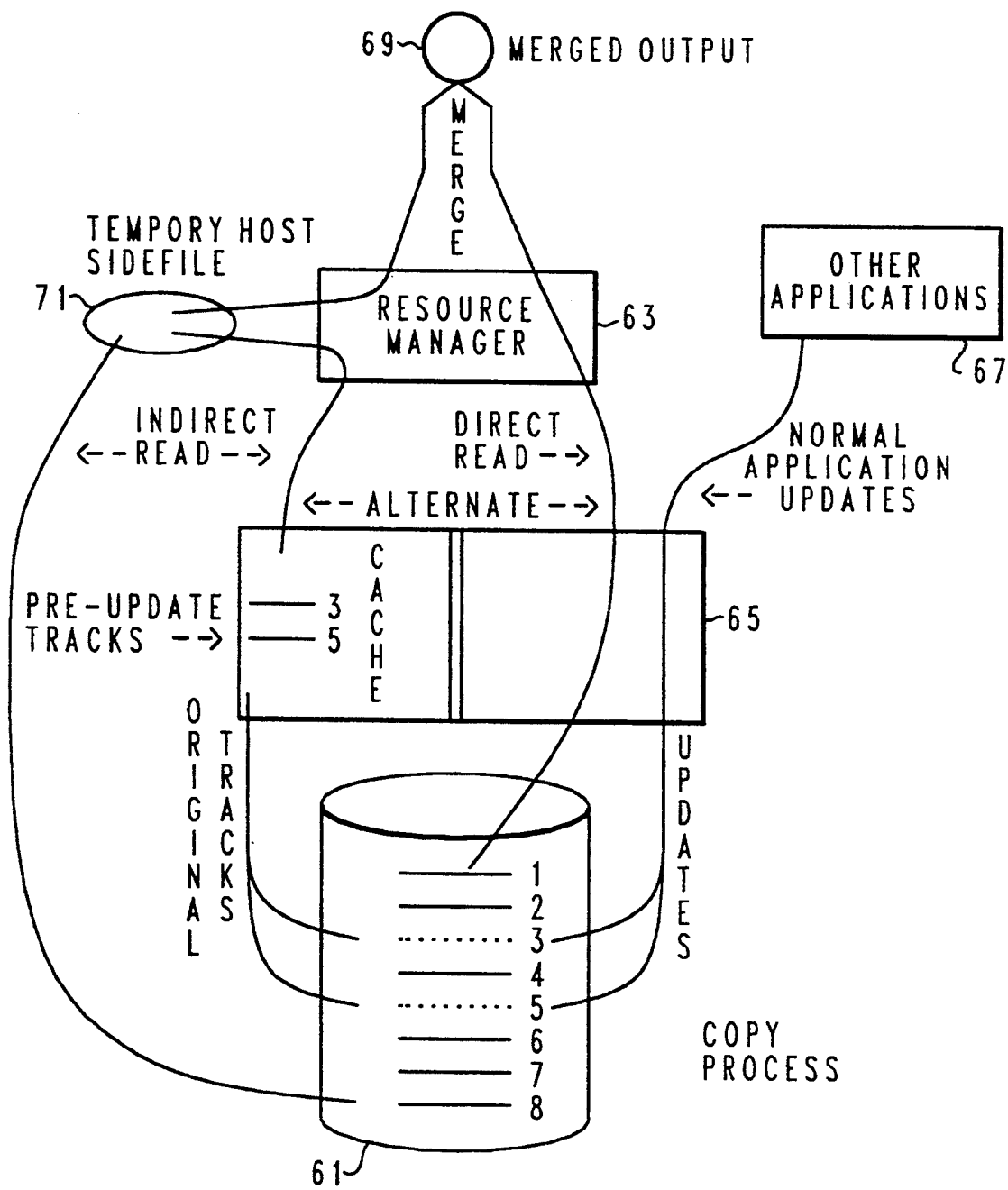
FIG. 3 illustrates a conceptual flow of a time zero backup copy in accordance with the method and system of the present invention.

With reference now to the figures and in particular with reference to FIG. 1, there is depicted a multiprocessing, multiprogramming data processing system according to the prior art. Such systems typically include a plurality of processors 1 and 3 which access external storage units 21, 23, 25, 27, and 29 over redundant channel demand/response interfaces 5, 7 and 9.

The illustrated embodiment in FIG. 1 may be provided in which each processor within the data processing system is implemented utilizing an IBM/360 or 370 architected processor type having, as an example, an IBM MVS (Multiple Virtual Storage) operating system. An IBM/360 architected processor is fully described in Amdahl et al., U.S. Pat. No. 3,400,371, entitled *Data Processing System*, issued on Sep. 3, 1968. A configuration in which multiple processors share access to external storage units is set forth in Luiz et al., U.S. Pat. No. 4,207,609, entitled *Path Independent Device Reservation and Reconnection in a Multi-CPU and Shared Device Access System*, issued Jan. 10, 1980.

The MVS operating system is also described in IBM Publication GC28-1150, entitled *MVS/Extended Architecture System Programming Library: System Macros and Facilities*, Vol. 1. Details of standard MVS or other operating system services, such as local lock management, subsystem invocation by interrupt or monitor, and the posting and waiting of tasks is omitted. These operating systems services are believed to be well known to those having skill in this art.

Still referring to FIG. 1, as described in Luiz et al., a processor process may establish a path to externally stored data in an IBM System 370 or similar system through an MVS or other known operating system by invoking a START I/O, transferring control to a channel subsystem which reserves a path to the data over which transfers are made. Typically, executing applications have data dependencies and may briefly suspend operations until a fetch or update has been completed. During such a transfer, the path is locked until the transfer is completed.

Referring now to FIGS. 2A-2B, there are depicted time lines illustrating the backup window in a batch or streaming process in the prior art and in a time zero backup system. As illustrated at FIG. 2A, multiple backup operations have occurred, as indicated at backup windows 41 and 43. Application processing is typically suspended or shut down just prior to each backup window and this suspension will persist until the backup process has been completed. Termination of the backup window signifies completion of the backup process and commitment. By "completion" what is meant is that all data that was to have been copied was in fact read from the source. By "commitment" what is meant is that all data to be copied was in fact written to an alternate storage location.

Referring now to FIG. 2B, backup windows for a time zero backup copy system are depicted. As described in detail within the copending cross-referenced patent application, each backup window 45 and 47 still requires the suspension or termination of application processing; however, the suspension or termination occurs only for a very short period of time. As described in the cross-referenced application, the time zero backup method begins, effectively freezing data within the datasets to be backed up at that point in time.

Thereafter, a bit map is created identifying each track within the datasets to be backed up and after creation of that bit map, the copy is said to be "logically complete." The committed state, or "physically complete" state will not occur until some time later. However, at the "logically complete" point in time, the data is completely usable by applications within the data processing system. The time during which application processing is suspended in such a system is generally in the low subsecond range; however, those skilled in the art will appreciate that the amount of time required to create a bit map to the data to be copied will depend upon the amount of data within the datasets.

Of course, those skilled in the art will appreciate that if the time zero backup process terminates abnormally between the point of logical completion and the point of physical completion, the backup copy is no longer useful and the process must be restarted. In this respect, the time zero backup process is vulnerable in a manner very similar to that of backup systems in the prior art. That is, all backup operations must be rerun if the process terminates abnormally prior to completion. It should thus be apparent that by permitting concurrent access to data during a backup copying operation the process will complete more rapidly, minimizing the amount of time that the backup operation is exposed to the possibility of an abnormal termination.

With reference now to FIG. 3, there is depicted a conceptual flow of the creation of a time zero backup copy in accordance with the method and system of the present invention. As illustrated, a time zero backup copy of data within a tracked cyclic storage device 61 may be created. As those skilled in the art will appreciate, data stored within such a device is typically organized into records and datasets. The real address of data within external storage is generally expressed in terms of Direct Access Storage Device (DASD) volumes, cylinders and tracks. The virtual address of such data is generally couched in terms of base addresses and offsets and/or extents from such base addresses.

Further, a record may be of the count-key-data format. A record may occupy one or more units of real storage. A "dataset" is a logical collection of multiple records which may be stored on contiguous units of real storage or which may be dispersed. Therefore, those skilled in the art will appreciate that if backup copies are created at the dataset level it will be necessary to perform multiple sorts to form inverted indices into real storage. For purposes of explanation of this invention, backup processing will be described as managed both at the resource manager level within a data processing system and at the storage control unit level.

As described above, each processor typically includes an operating system which includes a resource manager component. Typically, an IBM System 370 type processor running under the MVS operating system will include a resource manager of the data facilities dataset services (DFDSS) type which is described in U.S. Pat. No. 4,855,907, Ferro et al., issued Aug. 8, 1989, entitled *Method for Moving VSAM Base Clusters While Maintaining Alternate Indices Into the Cluster.* DFDSS is also described in IBM Publication GC26-4388, entitled *Data Facility Dataset Services: User's Guide.* Thus, a resource manager 63 is utilized in conjunction with a storage control unit 65 to create an incremental backup copy of designated datasets stored within tracked cyclic storage device 61.

As will be described below, the backup copy process includes an initialization period during which datasets are sorted, one or more bit maps are created and logical completion of the bit map is signaled to the invoking process at the processor. The listed or identified datasets are then sorted according to access path elements down to DASD track granularity. Next, bit maps are constructed which correlate the dataset and the access path insofar as any one of them is included or excluded from a given copy session. Lastly, resource manager 63 signals logical completion, indicating that updates will be processed against the dataset only after a short delay until such time as physical completion occurs.

Following initialization, resource manager 63 begins reading the tracks of data which have been requested. As will be explained in greater detail herein, this is accomplished by utilizing a unique control block within the data processing system which identifies a particular storage device, in association with a data retrieval command sequence which identifies specific data to be read. While a copy session is active, each storage control unit monitors all updates to the dataset. If an update is received from another application 67, storage control unit 65 will execute a predetermined algorithm to process that update, as described below.

In a time zero backup copy system a determination is first made as to whether or not the update attempted by application 67 is for a volume which is not within the current copy session. If the volume is not within the current copy session, the update completes normally. Alternately, if the update is for a volume which is part of the copy session, the primary session bit map is checked to see if that track is protected. If the corresponding bit within the bit map is off, indicating the track is not currently within a copy session, the update completes normally. However, if the track is protected (the corresponding bit within the bit map is on) the track in question is part of the copy session and has not as yet been read by the resource manager 63. In such a case, storage control unit 65 temporarily buffers or defers the update and writes a copy of the affected track into a memory within storage control unit 65. Thereafter, the update is permitted to complete.

Thus, ms illustrated in FIG. 3, an update initiated by application 67 may be processed through storage control unit 65 to update data at tracks 3 and 5 within tracked cyclic storage unit 61. Prior to permitting the update to occur, tracks 3 and 5 are written as sidefiles to a memory within storage control unit 65 and thereafter, the update is permitted to complete. The primary bit map is then altered to indicate that the copies of tracks 3 and 5, as those tracks existed at the time a backup copy was requested, are no longer within tracked cyclic storage device 61 but now reside within a memory within storage control unit 65.

A merged copy, representing the designated dataset as of the time a backup copy was requested, is then created at reference numeral 69, by copying non-updated tracks directly from tracked cyclic storage device 61 through resource manager 63, or by indirectly copying those tracks from tracked cyclic storage device 61 to a temporary host sidefile 71, which may be created within the expanded memory store of a host processor. Additionally, tracks within the dataset which have been written to sidefiles within a memory in storage control unit 65 prior to completion of an update may also be indirectly read from the memory within storage control unit 65 to the temporary host sidefile 71. Those skilled in the art will appreciate that in this manner a copy of a designated dataset may be created from unaltered tracks within tracked cyclic storage device 61, from updated tracks stored within memory of storage control unit 65 and thereafter transferred to temporary host sidefile 71, wherein these portions of the designated dataset may be merged in backup copy order, utilizing the bit map which was created at the time the backup copy was initiated. As should be apparent, increased concurrency of access to each of these portions of data will significantly accelerate the backup process.

Figure 4:
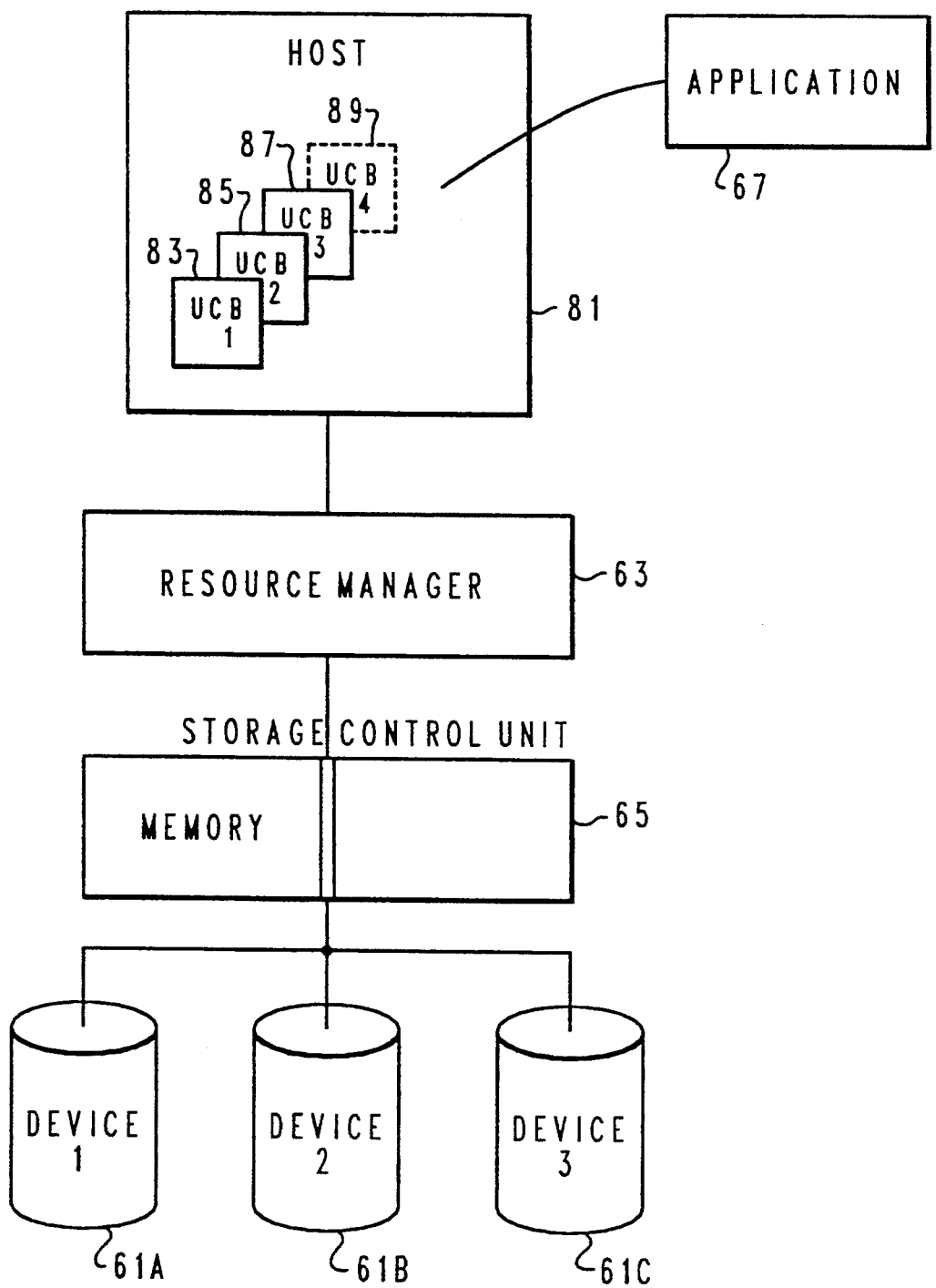
FIG. 4 depicts in schematic form the process by which an application may access data within external storage in accordance with the method and system of the present invention.

Referring now to FIG. 4 there is depicted in schematic form the process by which an application may access data within external storage in accordance with the method and system of the present invention. As illustrated, data may be stored within a plurality of tracked cyclic storage devices 61a, 61b, and 61c, which are coupled to a host processor 81, via a subsystem storage control unit 65. Additionally, a resource manager 63 may also be utilized to control the accessing of data within tracked cyclic storage devices 61a, 61b and 61c. As illustrated, an application 67 may be utilized to access data stored within one of the storage devices coupled to host processor 81. Application 67 may constitute a backup program or any other application seeking to copy data from within storage devices 61a, 61b, and 61c.

As will be appreciated by those skilled in the art, the accessing of data within an associated storage device in a data processing system of the type described is typically accomplished utilizing a Unique Control Block (UCB), sometimes referred to as a Device Control Block (DCB). In most such applications, each Unique Control Block (UCB) 83, 85, and 87 is associated with a particular storage device and serves as a "token" to be utilized by various applications desiring to access data within an associated storage device. That is, if application 67 desires to access data within storage device 61a, it will utilize the Unique Control Block (UCB) indicated at reference numeral 83, and during the period of time while application 67 is accessing data within storage device 61a, no other application will be permitted to access storage device 61a. This technique is generally utilized to avoid contention by multiple applications for utilization of individual storage devices and effectively prohibits the attempted access of a storage device by multiple applications simultaneously. Of course, those skilled in the art will appreciate that this situation may arise as a result of a restriction within the host processor regarding simultaneous access of storage devices or a similar restriction within a storage control unit. Data within an associated external storage device may be accessed by application 67 utilizing a Unique Control Block (UCB) which identifies a particular storage device. Data within that storage device may then be accessed by application 67 by the utilization of an associated data retrieval command sequence which specifies the location of the desired data, within an associated storage device.

Next, in accordance with an important feature of the present invention the method and system whereby high concurrency of access to designated data within an external storage system may be obtained is illustrated. After copying selected data from storage device 61a to memory within storage control unit 65, that data may be accessed by application 67 by utilizing an alternate Unique Control Block (UCB), such as Unique Control Block (UCB) 87. Preferably, application 67 will select a Unique Control Block (UCB) which is rarely utilized and will then associate with that selected alternate Unique Control Block (UCB) a selected data retrieval command sequence which identifies the data to be retrieved as data within memory in storage control unit 65.

Thus, despite the utilization of a Unique Control Block (UCB) associated with an alternate storage device, the data stored within memory within storage control unit 65 will be returned to application 67. In this manner, application 67 may access data which was previously located within storage control device 61a by utilizing a Unique Control Block (UCB) associated with an alternate storage device, as a result of the fact that the data has been copied to subsystem memory within storage control unit 155. Similarly, a fourth Unique Control Block (UCB) 89 may be provided which is associated with a nonexistent or virtual storage device. In this manner, by utilizing Unique Control Block (UCB) 89 application 67 may access data which was within an identified storage device, without contending for access to that storage device.

Figure 5:
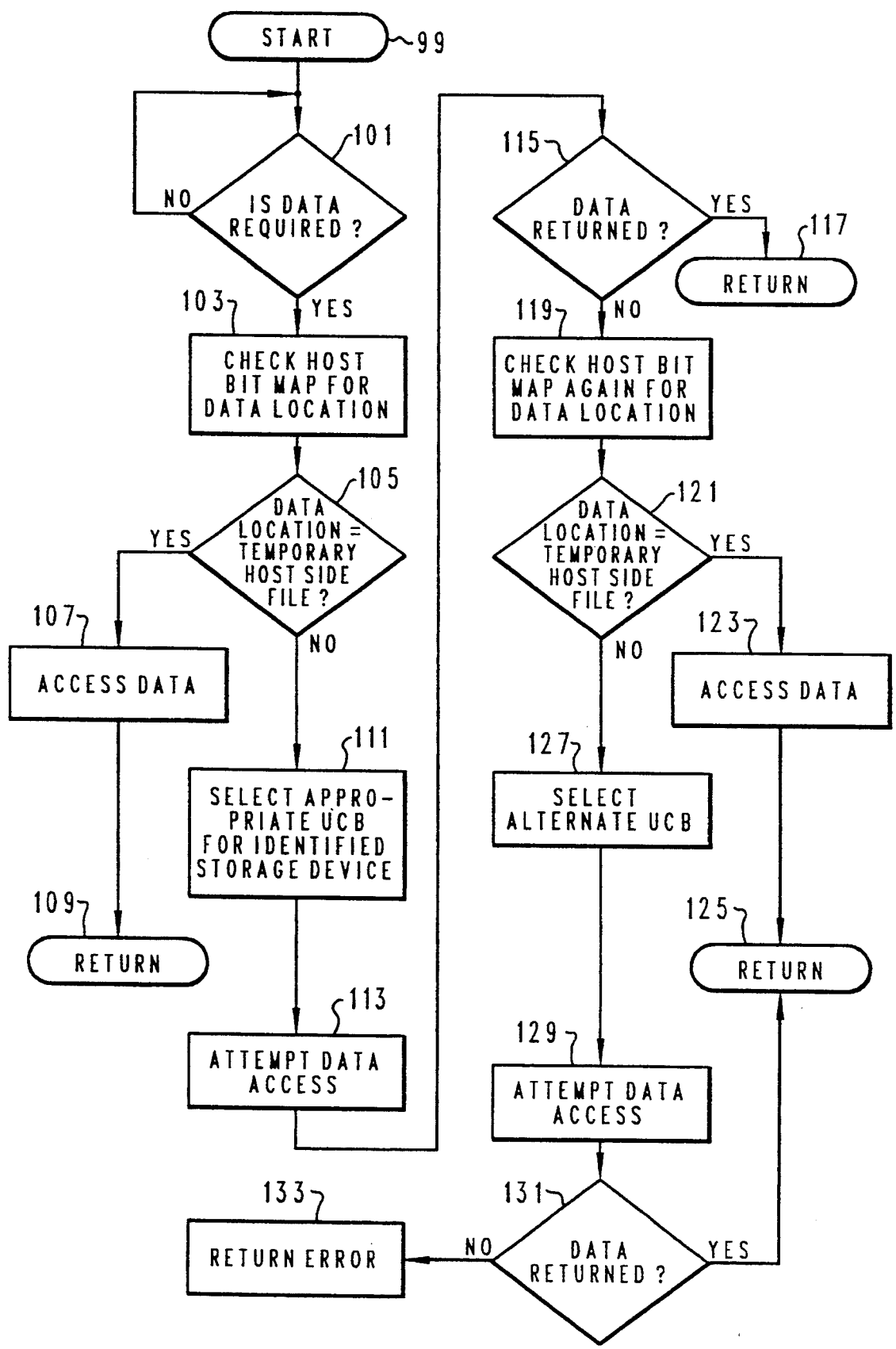
FIG. 5 is a high level logic flowchart which illustrates the concurrent access of data within external storage during a time zero backup copy in accordance with the method and system of the present invention.

With reference now to FIG. 5, there is depicted a high level logic flowchart which illustrates the concurrent access of data within external storage during a time zero backup copy, in accordance with the method and system of the present invention. As illustrated, the process begins at block 99 and thereafter passes to block 101 which depicts a determination of whether or not data is required. If not, the process merely iterates until such time data is required.

After a data access is attempted, the process passes to block 103, which illustrates the checking of the host bit map to determine the data location. Next, in the event the data location listed within the host bit map indicates that the desired data is within temporary host sidefile 71 (see FIG. 3), that data is then accessed, as depicted at block 107, and the process returns to await a further requirement for data, as illustrated at block 109.

Referring again to block 105, in the event the data location returned from the host bit map indicates that the data is not within temporary host sidefile 71 (see FIG. 3), the process passes to block 111. Block 111 illustrates the selection of the appropriate Unique Control Block (UCB) associated with the identified storage device within which the desired data is stored. The process then passes to block 113, which illustrates an attempt to access the data within that storage device, utilizing the appropriate Unique Control Block (UCB) and an associated data retrieval command sequence.

The process then passes to block 115 which illustrates a determination of whether or not the desired data has been returned. If so, the process passes to block 117 and returns to await a further requirement of data. In the event the desired data is not returned the process passes to block 119. Block 119 illustrates the checking of the host bit map again for data location, in order to determine whether or not the data location within the host bit map has been updated. Those skilled in the art will appreciate that the updating of a host bit map which contains address locations for desired data is an asynchronous occurrence, and may not accurately reflect the location of data at a particular point in time.

Next, block 121 illustrates a determination of whether or not the host bit map now indicates that the desired data is located within temporary host sidefile 71. If so, the process passes to block 123, illustrating an access of that data and the process then returns, as depicted at block 125.

Referring again to block 121, in the event the data location returned from the host bit map does not indicate that the data is within temporary host sidefile 71, the process passes to block 127. Block 127 illustrates the selection of an alternate Unique Control Block (UCB), in the manner described above. Thereafter, the process passes to block 129 which illustrates an attempt at data access within subsystem memory within storage control unit 65.

In the event data is returned from subsystem memory within storage control unit 65, as depicted at block 131, the process passes to block 125 and returns to await a further request for data. However, in the event the data is not returned from the attempted access within subsystem memory in storage control unit 65, the process passes to block 133, which illustrates the returning of an error message.

Upon reference to the foregoing those skilled in the art will appreciate that by providing a selected data retrieval command sequence which identifies desired data as having been copied to subsystem memory within a storage control unit, the method and system of the present invention permits that data to be accessed utilizing any selected Unique Control Block (UCB), substantially eliminating contention for access to a particular storage device during backup copying of data.

While the invention has been particularly shown and described with reference to a preferred embodiment, it will be understood by those skilled in the art that various changes in form and detail may be made therein without departing from the spirit and scope of the invention.

We claim:

1. A method in a data processing system for permitting high concurrency of access to designated data storage in a storage subsystem comprising a plurality of storage devices which are coupled to said data processing system via a storage device control unit having a subsystem memory therein, wherein data is accessed by said data processing system from one of said plurality of storage devices utilizing one of a plurality of Unique Control Blocks (UCBs), each UCB identifying a selected one of said plurality of storage devices and permitting only one application to access said selected one of said plurality of storage devices at a time, and an associated data retrieval command sequence which identifies data to be accessed within said selected one of said plurality of storage devices, said method comprising the steps of:
copying at least a portion of said designated data from a first one of said plurality of storage devices to said subsystem memory within said storage device control unit;
selecting a UCB which identifies a second one of said plurality of storage devices; and
associating a selected data retrieval command sequence with said selected UCB which identifies said second one of said plurality of storage devices, said selected data retrieval command sequence identifying said at least a portion of said designated data as located within said subsystem memory wherein other data within said first one of said plurality of storage devices may be concurrently accessed utilizing an alternate UCB.

2. The method in a data processing system for permitting high concurrency of access to designated data stored within a storage subsystem comprising a plurality of storage devices according to claim 1, wherein said step of selecting a UCB which identifies a second one of said plurality of storage devices comprises the step of selecting a UCB which identifies a rarely utilized storage device.

3. The method in a data processing system for permitting high concurrency of access to designated data stored within a storage subsystem comprising a plurality of storage devices according to claim 1, wherein said step of selecting a UCB which identifies a second one of said plurality of storage devices comprises the step of selecting a UCB which identifies a nonexistent storage device.

4. The method in a data processing system for permitting high concurrency of access to designated data stored within a storage subsystem comprising a plurality of storage devices according to claim 1, further including the step of maintaining a data logical-to-physical storage system address concordance for identifying said portion of said designated data copied from said first one of said plurality of storage devices to said subsystem memory.

5. The method in a data processing system for permitting high concurrency of access to designated data stored within a storage subsystem comprising a plurality of storage devices according to claim 4, further including the step of altering said data logical-to-physical storage system address concordance each time a portion of said designated data is relocated.

6. A method in a data processing system for permitting high concurrency of access to designated data stored in a storage subsystem comprising a plurality of storage devices which are coupled to said data processing system via a storage device control unit having a subsystem memory therein during backup copying thereof, wherein data is accessed by said data processing system from one of said plurality of storage devices utilizing one of a plurality of Unique Control Blocks (UCBs), each UCB identifying a selected one of said plurality of storage devices and permitting only one application to access said selected one of said plurality of storage devices at a time, and an associated data retrieval command sequence which identifies data to be accessed within said selected one of said plurality of storage devices, said method comprising the steps of:
forming a data logical-to-physical storage system address concordance for said designated data;
physically backing up a portion of said designated data within a first one of said plurality of storage devices on a scheduled or opportunistic basis by accessing and copying said portion of said designated data utilizing a first UCB which identifies said first one of said plurality of said storage devices;
performing at said first one of said plurality of storage devices any application initiated updates to uncopied designated data by temporarily deferring said updates, writing sidefiles of said uncopied designated data which is affected by said updates to said subsystem memory and thereafter writing said updates to said first storage device; and
accessing and copying said sidefiles by:
selecting a UCB which identifies a second one of said plurality of storage devices; and
associating a selected data retrieval command sequence with said selected UCB which identifies said second one of said plurality of storage devices, said selected data retrieval command sequence identifying said at least a portion of said designated data as located within said subsystem memory wherein other data within said first one of said plurality of storage devices may be concurrently accessed utilizing an alternate UCB.

7. The method in a data processing system for permitting high concurrency of access to designated data stored within a storage subsystem comprising a plurality of storage devices according to claim 6, wherein said step of selecting a UCB which identifies a second one of said plurality of storage devices comprises the step of selecting a UCB which identifies a rarely utilized storage device.

8. The method in a data processing system for permitting high concurrency of access to designated data stored within a storage subsystem comprising a plurality of storage devices according to claim 6, wherein said step of selecting a UCB which identifies a second one of said plurality of storage devices comprises the step of selecting a UCB which identifies a nonexistent storage device.

9. A data processing system for permitting high concurrency of access to designated data stored in a storage subsystem comprising a plurality of storage devices which are coupled to said data processing system via a storage device control unit having a subsystem memory therein, wherein data is accessed by said data processing system from one of said plurality of storage devices utilizing one of a plurality of Unique Control Blocks (UCBs), each UCB identifying a selected one of said plurality of storage devices and permitting only one application to access said selected one of said plurality of storage devices at a time, and an associated data retrieval command sequence which identifies data to be accessed within said selected one of said plurality of storage devices, said data processing system comprising the steps of:

means for copying at least a portion of said designated data from a first one of said plurality of storage devices to said subsystem memory within said storage device control unit;

means for selecting a UCB which identifies a second one of said plurality of storage devices; and means for associating a selected data retrieval command sequence with said selected UCB which identifies said second one of said plurality of storage devices, said selected data retrieval command sequence identifying said portion of said designated data as located within said subsystem memory wherein other data within said first one of said plurality of storage devices may be concurrently accessed utilizing an alternate UCB.

10. The method in a data processing system for permitting high concurrency of access to designated data stored within a storage subsystem comprising a plurality of storage devices according to claim 1, further including means of maintaining a data logical-to-physical storage system address concordance for identifying said portion of said designated data copied from said first one of said plurality of storage devices to said subsystem memory.

11. The data processing system for permitting high concurrency of access to designated data stored within a storage subsystem comprising a plurality of storage devices according to claim 10, further including means for altering said data logical-to-physical storage system address concordance each time a portion of said designated data is relocated.

* * * * *